(12) United States Patent
Konno et al.

(10) Patent No.: US 6,480,458 B1
(45) Date of Patent: Nov. 12, 2002

(54) APPARATUS FOR DRIVING A MOVABLE BODY

(75) Inventors: Youichi Konno; Tsutomu Muta, both of Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 13 days.

(21) Appl. No.: 09/589,513

(22) Filed: Jun. 8, 2000

(30) Foreign Application Priority Data

Jun. 8, 1999 (JP) .......................................... 11-160339

(51) Int. Cl.⁷ ............................................... G11B 21/02
(52) U.S. Cl. ........................................ 369/219; 369/15
(58) Field of Search .................................. 369/219, 215, 369/249, 220, 244, 258; 360/106, 109

(56) References Cited

U.S. PATENT DOCUMENTS

| | | | | |
|---|---|---|---|---|
| 4,442,516 A | * | 4/1984 | Funabashi | 369/43 |
| 4,951,164 A | * | 8/1990 | Yasaka et al. | 360/85 |
| 5,025,371 A | * | 6/1991 | Heinrich | 369/219 |
| 5,072,438 A | * | 12/1991 | Suzuki et al. | 369/290 |
| 5,124,972 A | * | 6/1992 | Heinrich | 369/219 |
| 6,044,057 A | * | 3/2000 | Park et al. | 369/219 |
| 6,081,500 A | * | 6/2000 | Seino | 369/215 |
| 6,175,544 B1 | * | 1/2001 | Shiomi | 369/219 |
| 6,285,649 B1 | * | 9/2001 | Bessho et al. | 369/219 |
| 6,298,031 B1 | * | 10/2001 | Morita et al. | 369/219 |

* cited by examiner

*Primary Examiner*—Allen Cao
*Assistant Examiner*—Dzung C. Nguyen
(74) *Attorney, Agent, or Firm*—Young & Thompson (57) ABSTRACT

An apparatus for driving a movable body, comprises a driving power source having an output shaft; and a driving gear provided on the output shaft to drive the movable body. The driving gear is capable of slipping relative to the output shaft of the driving power source. The output shaft of the driving power source may be connected to the movable body through a gear train for transmitting driving power from the driving power source to the movable body. In this case, the gear train includes the driving gear and the driving gear slips when a prescribed load is applied to the gear train.

12 Claims, 6 Drawing Sheets

PRIOR ART

APPARATUS FOR DRIVING A MOVABLE BODY

BACKGROUND OF THE INVENTION

1. Field of the Invention

The present invention relates to an apparatus for driving a movable body by means of a driving power source and a driving gear, and particularly to an apparatus for driving a pickup for an information recording and reproducing apparatus in the radius direction of a disc.

2. Description of the Related Art

Figure 7:
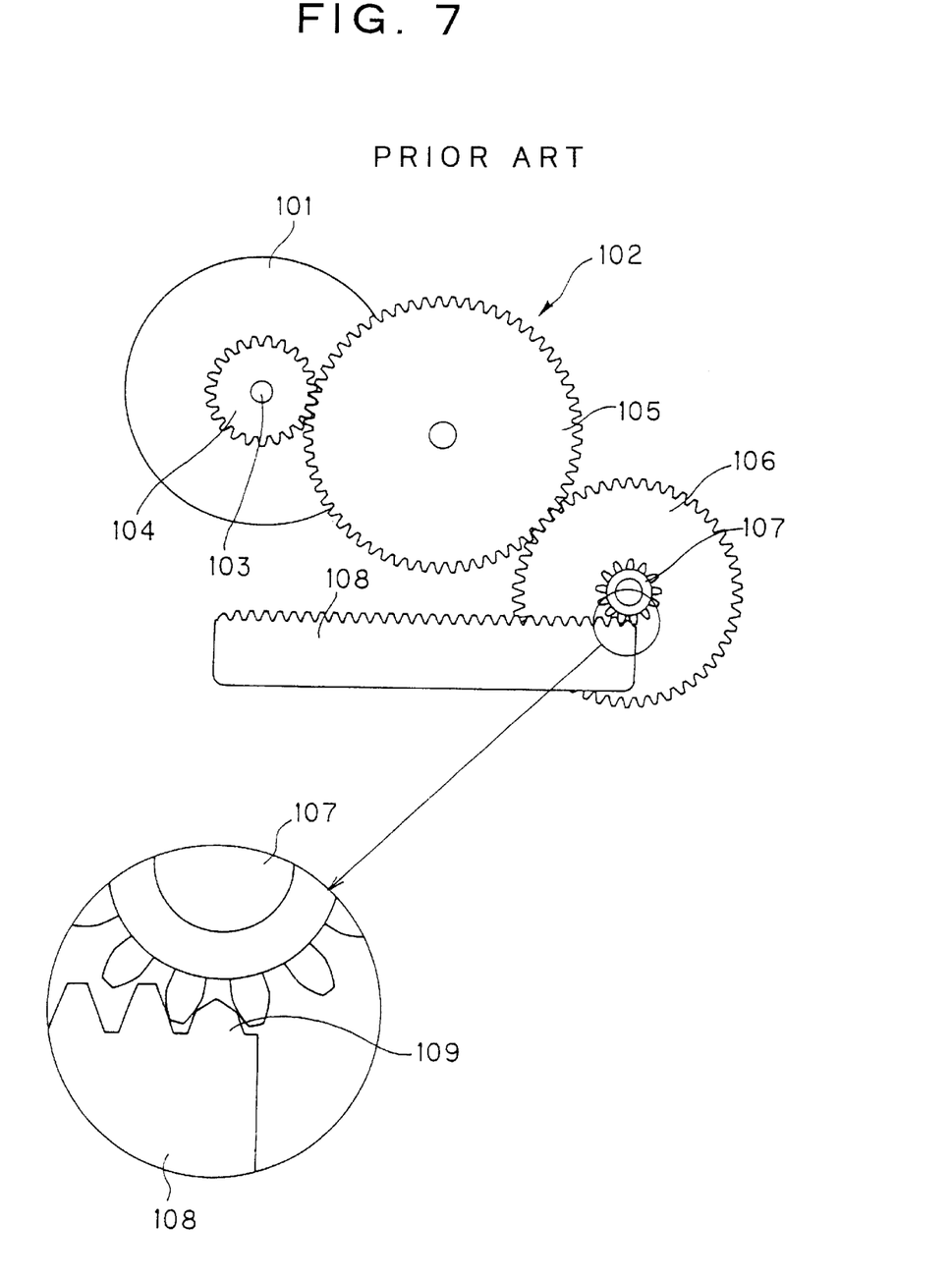
FIG. 7 is a descriptive view illustrating the conventional pickup driving apparatus.

There is known a conventional pickup driving apparatus, which has a driving motor 101 and a gear train 102 for transmitting driving power from the driving motor 101 to a pickup, as shown in FIG. 7. The gear train 102 comprises, for example, a driving gear 104 having a central bore into which an output shaft 103 of the driving motor 101 is fitted forcibly; a reduction gear 105 engaging with the driving gear 104; an intermediate gear 106 engaging with the reduction gear 105; a small gear 107 formed integrally with the intermediate gear 106; and a rack 108 engaging with the small gear 107. The pickup is connected to the rack 108 and supported slidably on a guide shaft provided on a base. Drive of the driving motor 101 causes driving power to be transmitted sequentially to the respective gears 104, 105, 106 and 107 and the rack 108. As a result, the pickup slides along the guide shaft so as to move in the radius direction of an optical disc;

Vibration and impact applied to a main body of the above-mentioned pickup driving apparatus causes an excessively large force to be applied to the gear train 102. Even after the pickup moves at a single stroke from the central side of the disc toward the outer peripheral side thereof, or from the outer peripheral side thereof toward the central side thereof, to reach the limit position of the sliding range along the guide shaft, a shaft of the driving motor 101 may rotate due to the inertial force of the driving motor 101 itself, thus applying force having a function of further moving the pickup. In such a case, an excessively large force is applied to the gear train 102. Application of such an excessively large force to the gear train 102 causes the teeth of the gear to be broken and a shaft for the gear to be deformed.

In order to prevent the occurrence of such a problem, the teeth of the rack 108, which locate on the opposite sides, are formed into a deformed teeth 109 having a reduced height. When a prescribed load is applied to the engaging portions of the gear train 102, the guide shaft for supporting the pickup and a boss for supporting the respective gear may deform to cause the tooth of the small gear 107 to jump over the deformed tooth 109 of the rack 108 (hereinafter referred to as the "tooth jump") to make an engagement of the small gear 107 with the rack 108. Stress applied onto the tooth flank may be released in this manner.

However, in the conventional pickup driving apparatus, it is necessary to form the deformed teeth on the opposite ends of the rack, thus requiring a high precision in formation of the rack.

In addition, an improperly long distance between the rack and the small gear causes the tooth jump easily, but a proper engagement of the small gear and the rack cannot be provided. On the contrary, an improperly short distance between them does not cause the tooth jump. Accordingly, a precise control is required in distance between the rack and the small gear, and an assembling step cannot be carried out easily. A frequent occurrence of the tooth jump between the small gear and the rack causes the deformed teeth to wear away, thus causing problems in durability. A reciprocal motion of the driving motor in a small stroke is required to recover the normal state from the tooth jumping state, thus requiring a relatively long period of time.

SUMMARY OF THE INVENTION

An object of the present invention is therefore to provide an apparatus for driving a movable body, which can prevent an excessively large force from being applied to the gear train, without forming deformed teeth on the opposite ends of the rack to which a the movable body such as a pickup is to be connected.

In accordance with the inventors' attention directed to the fact that the driving gear, having the central bore in which the output shaft of the driving power source is fitted forcibly, may slip to rotate relative to the output shaft when a torque applied to the driving gear exceeds a prescribed value, the prescribed torque value is determined so that the driving gear does not slip relative to the output shaft in case of the normal use condition of the driving apparatus, on the one hand, and that the driving gear slips relative to the output shaft in case of the overloaded condition of the driving gear, thus preventing an excessively large load from being applied to the gear train.

In order to attain the aforementioned object, an apparatus of the present invention for driving a movable body comprises:

a driving power source having an output shaft; and
a driving gear provided on said output shaft to drive said movable body,
wherein:
said driving gear is capable of slipping relative to said output shaft of said driving power source.

According to the apparatus of the present invention, the driving gear may slip relative to the output shaft, thus preventing an excessively large load from being applied to the engaging portions of the gear train. It is therefore possible to prevent the excessively large load from being applied to the gear train without forming deformed teeth on the opposite ends of the rack, which forms a part of the gear train. A normal working precision in formation of the rack suffices. There is not required a high precision arrangement to adjust the distance between the driving gear and the rack in the assembling step. Gears of the gear train always engage with each other, thus requiring no reciprocal motion of the driving power source in a small stroke to recover the normal state from the tooth jumping state. The driving operation of the movable body driving apparatus can be simplified, permitting to make a rapid operation.

In the above-mentioned apparatus of the present invention, there may be adopted a structure in which said output shaft of said driving power source is connected to said movable body through a gear train for transmitting driving power from said driving power source to said movable body, said gear train including said driving gear; and said driving gear slips when a prescribed load is applied to said gear train. In the present invention, the gear train includes a rack for moving linearly the movable body.

The prescribed torque by which the driving gear slips relative to the output shaft, is determined so that the driving gear does not slip relative to the output shaft in case of the normal use condition of the driving apparatus, on the one hand, and that the driving gear slips relative to the output shaft in case where stress, which may break the tooth flank of the gear train, is applied by vibration, impact and the like, on the other hand. The prescribed torque can be obtained by adjusting the fitting condition of the driving gear into the output shaft, or adjusting the fitting length of them, or selecting material for the output shaft and the driving gear.

According to the above-mentioned structure, when the prescribed load is applied to the gear train, the driving gear slips relative to the output shaft, thus preventing an excessively large load from being applied to the engaging portions of the gear train. It is therefore possible to prevent the excessively large load from being applied to the gear train without forming deformed teeth on the opposite ends of the rack, which forms a part of the gear train. Gears of the gear train always engage with each other, thus requiring no reciprocal motion of the driving power source in a small stroke to recover the normal state from the tooth jumping state. The driving operation of the movable body driving apparatus can be simplified, permitting to make a rapid operation.

The above-mentioned apparatus of the present invention may further comprise a stopping device for restricting movement of said driving gear in an axial direction of said output shaft.

According to the apparatus of the present invention, which has the stopping device, the stopping device restricts the movement of the driving gear in the axial direction of the output shaft when the driving gear slips relative to the output shaft. It is therefore possible to prevent the driving gear from coming off the output shaft, thus maintaining a proper engaging condition of the gear train.

In the above-mentioned apparatus of the present invention, there may be adopted a structure in which torque causing said driving gear to slip relative to said output shaft is larger than torque applied by said driving power source and smaller than breaking torque by which gear teeth of said gear train are broken.

According to the above-mentioned structure, it is possible to drive the movable body without causing the driving gear to slip relative to the output shaft in the case of the normal use condition of the driving apparatus, on the one hand, and to cause the driving gear to slip relative to the output shaft so as to prevent the tooth from being broken or deformed in case of a strong impact, which may break the tooth of the driving gear, is applied to the driving gear, on the other hand.

In the above-mentioned apparatus of the present invention, there may be adopted a structure in which said driving power source comprises a driving motor; and said movable body comprises a pickup for an information recording and reproducing apparatus, said pickup being movable in a radius direction of a disc.

According to the above-mentioned structure, it is possible to simplify the driving operation of the pickup driving apparatus, thus permitting to make a rapid operation.

DETAILED DESCRIPTION OF THE PREFERRED EMBODIMENTS

Now, embodiments of a movable driving apparatus of the present invention will be described in detail below with reference to the accompanying drawings.

Figure 1:
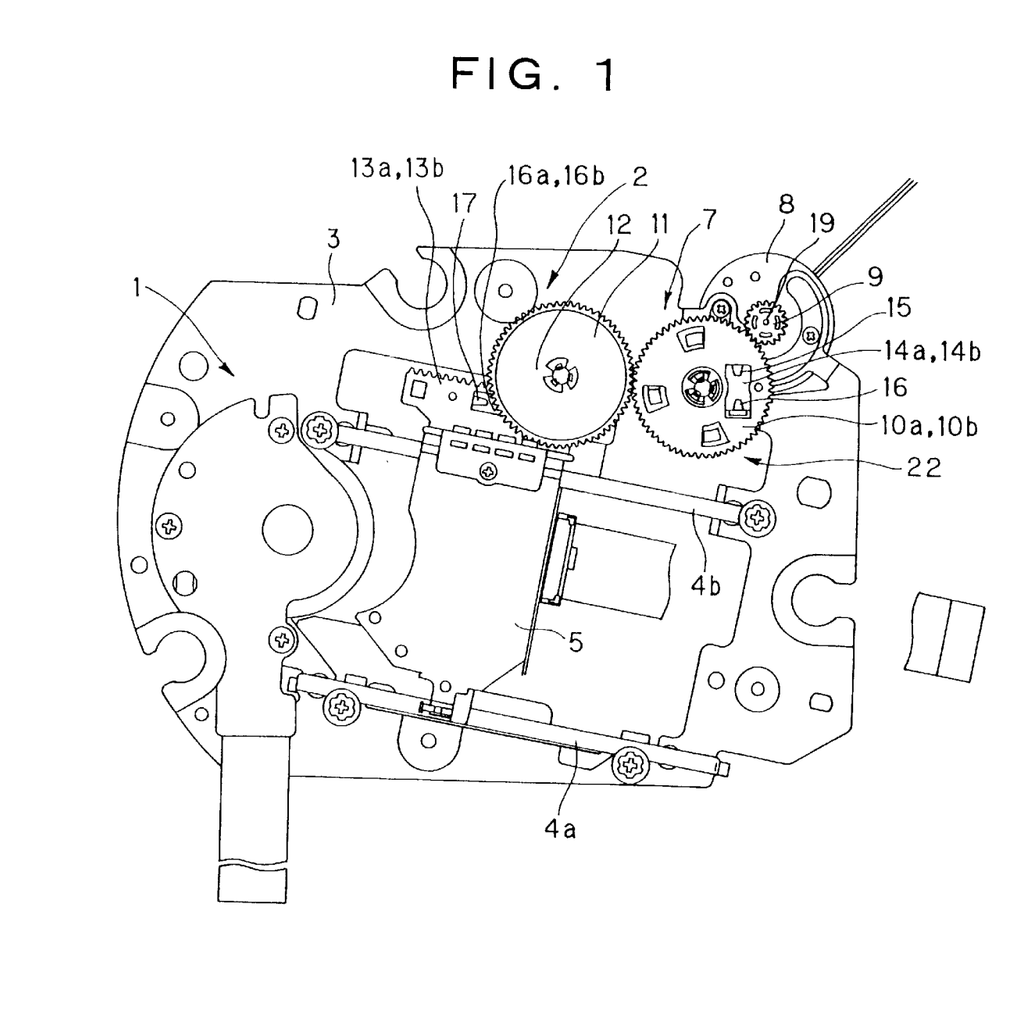
FIG. 1 is a bottom view illustrating an information recording and reproducing apparatus into which a pickup driving apparatus of the embodiment of the present invention is incorporated.
Figure 2:
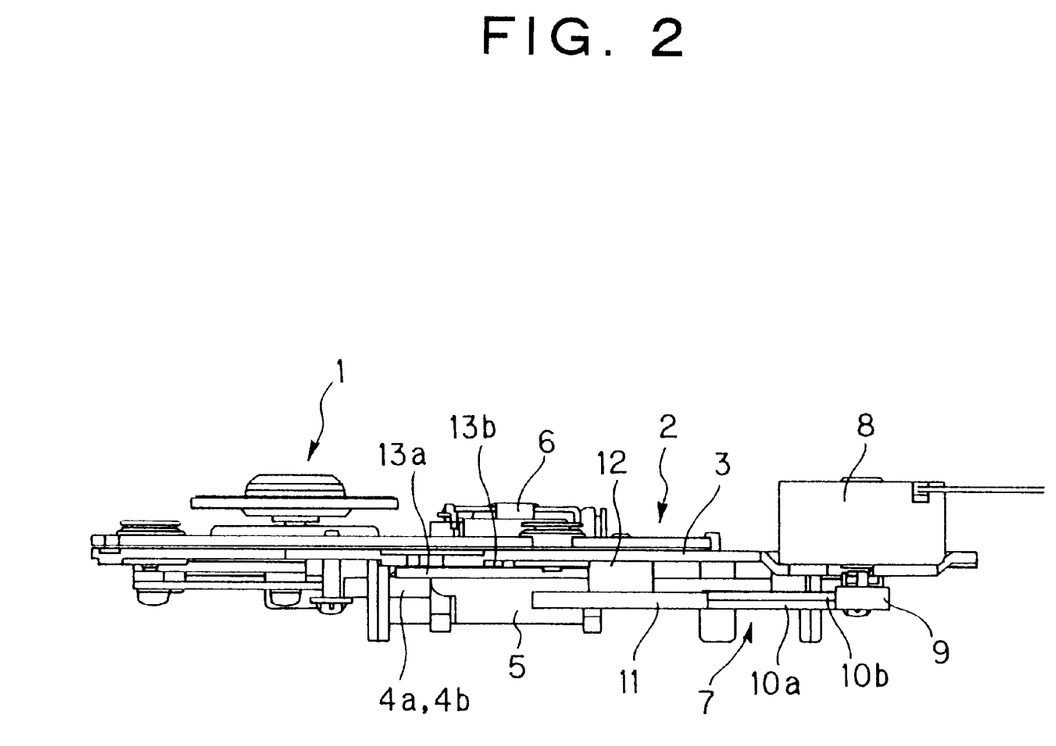
FIG. 2 is a side view of the pickup driving apparatus of the present invention.

FIGS. 1 and 2 illustrate an information recording and reproducing apparatus into which a pickup driving apparatus of the embodiment of the present invention is incorporated. FIG. 1 is a bottom view of the apparatus and FIG. 2 is a side view of it. The information recording and reproducing apparatus has a common base 3 on which a spindle motor rotational driver 1 for rotating an optical disc and a pickup driver 2 (i.e., a pickup driving apparatus) having an optical pickup and the like for reading information recorded on the optical disc are mounted. The pickup driving apparatus 2 is mainly used as a DVD-ROM driver in the information recording and reproducing apparatus.

The pickup driving apparatus 2 is composed of a pair of parallel guide shafts 4a, 4b disposed on the base 3, a servomechanism 5 guided on the guide shafts 4a, 4b so as to be capable of making a linear motion, an optical pickup 6 (hereinafter referred to as the "pickup 6") that is mounted on the servomechanism 5 so as to serve as a movable body, and a driving mechanism 7 for making reciprocal motion of the servomechanism 5. The driving mechanism 7 causes the pickup 6 to move linearly in the radius direction of the optical disc.

The driving mechanism 7 is composed of a driving motor 8, a driving gear 9, a pair of reduction gears 10a, 10b, an intermediate gear 11, a small gear 12 and a pair of racks 13a, 13b. The driving motor 8, which serves as a driving power source, is mounted on the one end of the base 3. The driving gear 9 is fitted on the output shaft 19 of the driving motor 8 so as to locate below the base 3. The reduction gears 10a, 10b are rotatably supported on the base 3 so as to engage with the driving gear 9. The intermediate gear 11 is rotatably supported on the base 3 so as to engage with the reduction gears 10a, 10b. The small gear 12 is formed integrally with the one surface of the intermediate gear 11 so as to be coaxial with it. The racks 13a, 13b are secured to the servomechanism 5 so as to engage with the small gear 12. The driving gear 9, the reduction gears 10a, 10b, the intermediate gear 11, the small gear 12 and the racks 13a, 13b form a gear train 22.

The pair of reduction gears 10a, 10b are combined with each other so that respective tooth flanks formed on their peripheries are coaxial with each other. The one reduction gear 10a has a rectangular opening 14a. A pin 15 projects from the one side of the opening 14a toward the other side of it. The other reduction gear 10b also has a rectangular opening 14b that correspond to the above-mentioned opening 14a. The other pin 16 projects from the other side of the opening 14b toward the one side of it so as to face the above-mentioned pin 15. The one reduction gear 10a is placed on the other reduction gear 10b. A coil spring locates between the pins 15, 16 facing each other, so as to impart resilient force for turning the pair of reduction gears 10a, 10b in the opposite direction to them. The tooth flanks of the respective reduction gears 10a, 10b nip the teeth of the driving gear 9 and the intermediate gear 11 under resilient force, resulting in a proper engagement of the reduction gears 10a, 10b, the driving gear 9 and the intermediate gear 11 without causing backlash.

The pair of racks 13a, 13b are combined with each other so that the tooth flanks formed on the one side of the rack 13a are placed on tooth flanks formed on the one side of the other rack 13b in the vertical direction. The racks 13a, 13b extend in parallel with the guide shafts 4a, 4b. The one rack 13a that is fixed to the servomechanism 5 has an opening 16a formed on the central portion of the rack 13a. The rack 13a also has a pin 17 projecting from the one side of the opening 16a toward the other side of it in the longitudinal direction of the rack 13a. The other rack 13b also has on its central portion an opening 16b corresponding to the above-mentioned opening 16a, and a pin (not shown) facing the abovementioned pin 17. A coil spring locates between the pin 17 formed on the one rack 13a and the pin formed on the other rack 13b, so as to impart resilient force for moving linearly the racks 13a, 13b in the opposite direction to them. The tooth flanks of the respective racks 13a, 13b nip the teeth of the small gear 12 under resilient force, resulting in a proper engagement of the racks 13a, 13b and the small gear 12 without causing backlash.

Figure 3:
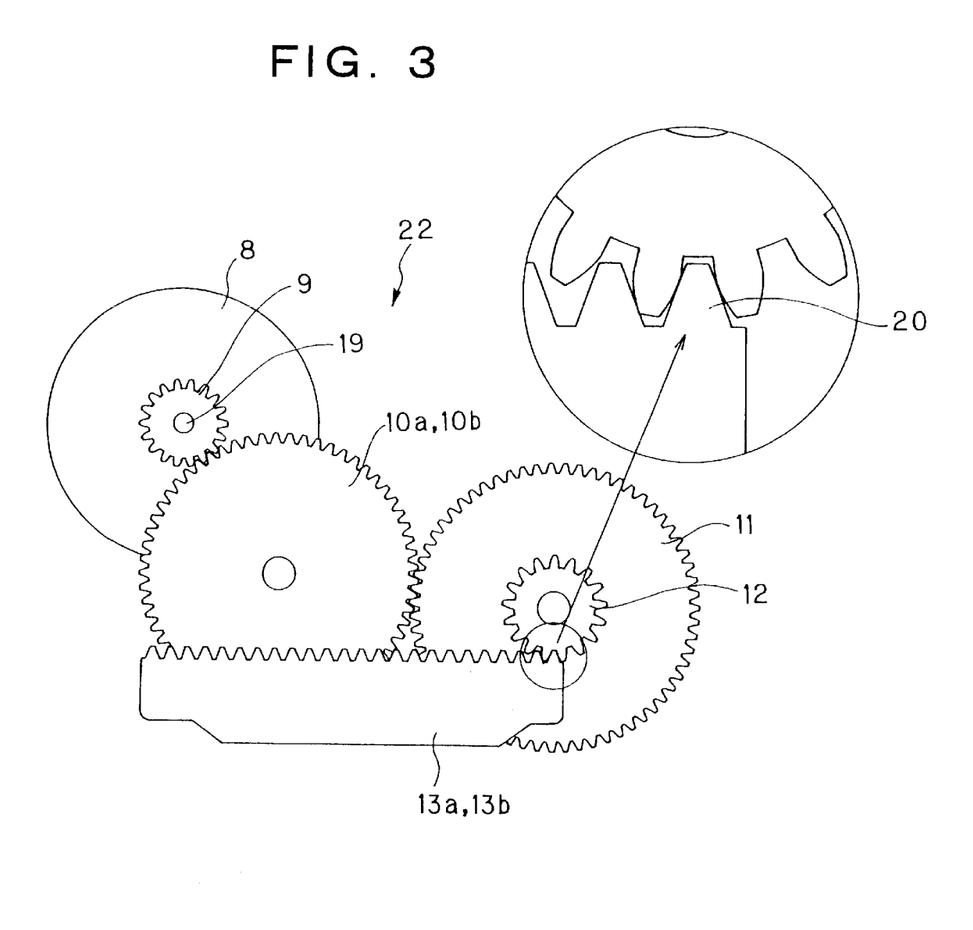
FIG. 3 is a descriptive view illustrating a driving mechanism of the pickup driving apparatus of the present invention.

FIG. 3 is a descriptive view illustrating the driving mechanism 7. Operation of the driving motor 8, which is carried out by instructions of a micro computer (not shown), causes the torque of the driving motor 8 to be transmitted sequentially to the driving gear 9 having the bore into which the output shaft 19 is fitted forcibly, the reduction gears 10a, 10b, the intermediate gear 11, the small gear 12 and the racks 13a, 13b. As a result, the pickup 6 moves to a prescribed position of the optical disc in the radius direction. As shown in an enlarged view in FIG. 3, the terminal engaging portions 20 of the racks 13a, 13b has a normal tooth shape. Accordingly, the tooth jump does not occur.

Figure 4:
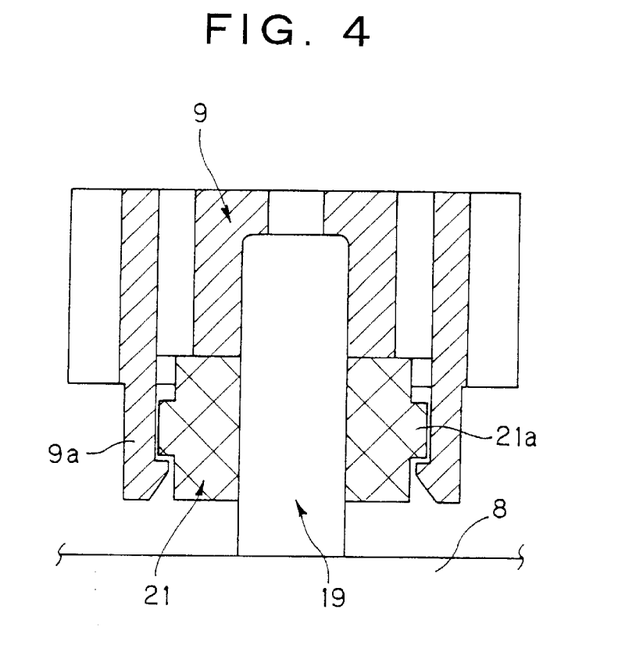
FIG. 4 is a cross sectional view illustrating a driving gear and a stopping device of the pickup driving apparatus of the present invention.

FIG. 4 is an enlarged view illustrating the driving gear 9 having the bore into which the output shaft 19 of the driving motor 8 is fitted forcibly. The fitting conditions of the output shaft 19 into the driving gear 9, i.e., the inner diameter of the fitting bore of the driving gear 9, the diameter of the output shaft 19, material for forming the output shaft 19 and the driving gear 9, and the fitting length of the output shaft 19 into the driving gear 9 are adjusted so that the prescribed load applied to the driving gear 9 causes it to slip relative to the output shaft 19. The torque causing the driving gear 9 to slip relative to the output shaft 19, is determined to be larger than torque applied by the driving motor 8 in its normal use condition and to be smaller than breaking torque by which the gear teeth of the gear train 22 are broken. The "breaking torque" means torque that causes stress exceeding allowable stress of the root end of the gear tooth to generate at the root end of it, leading to the breakage thereof.

An example of the determination of the prescribed torque will be described below. ① The maximum bending stress generating at the root end of the gear teeth is determined from allowable stress of material for forming the driving gear, taking into consideration safety factor. ② Slip torque causing the maximum bending stress is determined from this maximum bending stress, taking into consideration the material for forming the driving gear 9 and the dimensions of it. ③ By determining the value of slip torque obtained by the step in item ② above as the upper limit, the varying range of the slip torque is determined taking into consideration of variation of the slip torque due to a lapse of time and irregularity of the structural parts. ④ There is confirmed the fact that the slip torque as varied exceeds the total value of torque applied by the driving motor and margin of safety. If the above-mentioned fact conforming to the object of the present invention is confirmed, the slip torque obtained by the step in ② above is used as the target value of the slip torque (i.e., the prescribed torque).

According to the prescribed torque as determined, it is possible to drive the pickup 6 in a usual manner without causing the driving gear 9 to slip relative to the output shaft 19 in case of the normal use condition of the pickup driving apparatus, on the one hand, and to cause the driving gear 9 to slip relative to the output shaft 19, thus preventing the gear teeth from breaking and protecting the driving motor 8, when strong impact that may break the gear teeth of the gear train 22 is applied to the driving gear 9, on the other hand. Even after the pickup 6 moves at a single stroke from the central side of the disc toward the outer peripheral side thereof, or from the outer peripheral side thereof toward the central side thereof, to reach the limit position of the sliding range along the guide shaft 4a, 4b and the output shaft 19 of the driving motor 8 rotates due to the inertial force of the driving motor 8 itself or for the purpose of further movement of the pickup 6, the driving gear 9 slips relative to the output shaft 19, thus making it possible to prevent an excessively large stress from being applied to the tooth flank.

As shown in FIG. 4, a stopper 21 serving as a stopping device is provided under the lower surface of the driving gear 9. The stopper 21 has a tubular shape into which the output shaft 19 is fitted. The output shaft 19 is fitted tightly into the stopper 21 so that the stopper 21 rotates integrally with the output shaft 19. The stopper 21 has an expanded portion 21a that is formed by increasing the diameter of its central portion in the axial direction. The driving gear 9 has at its lower end an engaging portion 9a so as to surround the side portion of the stopper 21 and to engage with the expanded portion 2 1a of the stopper 21. The stopper 21 restricts the movement of the driving gear 9 in the axial direction of the output shaft 19. Accordingly, it is possible to prevent the position of the driving gear 9 from changing in the axial direction of the output shaft 19 and more specifically, to prevent the driving gear 9 from coming off the output shaft 19, when the driving gear 9 slips relative to the output shaft 19. As a result, a proper engagement of the driving gear 9 with the reduction gears 10a, 10b is maintained even if the driving gear 9 slips relative to the output shaft 19.

Figure 5:
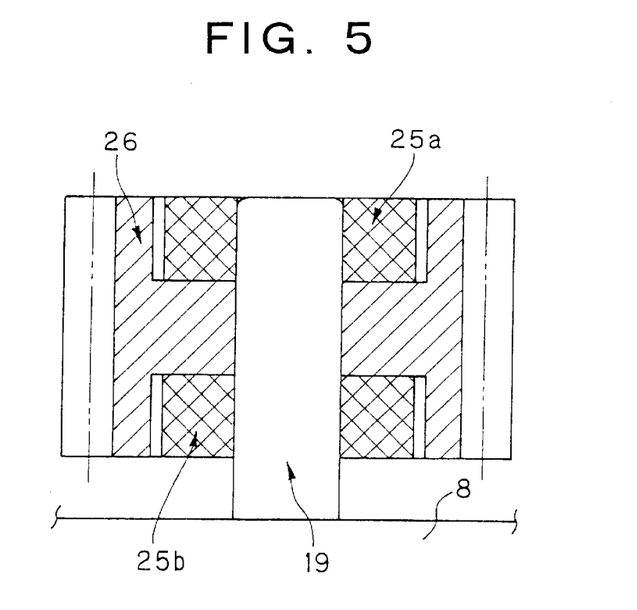
FIG. 5 is a cross sectional view illustrating modifications of the driving gear and the stopping device of the pickup driving apparatus of the present invention.

FIG. 5 illustrates the driving gear 26 and the stoppers 25a, 25b, which are modified. As shown in FIG. 5, the driving gear 26 may be held between the pair of stoppers 25a, 25b so that the movement of the driving gear 26 in the axial direction of the output shaft 19 is restricted. In this modification, the driving gear 26 has recesses formed on its opposite surfaces. The stoppers 25a, 25b having a tubular shape are fitted into the recesses, respectively. The driving gear 26 and the output shaft 19 are adjusted so that the former slips relative to the latter, when the prescribed torque is applied to the driving gear 26 in the same manner as in the above-mentioned driving gear 9. The output shaft 19 is fitted tightly into the stoppers 25a, 25b.

Figure 6:
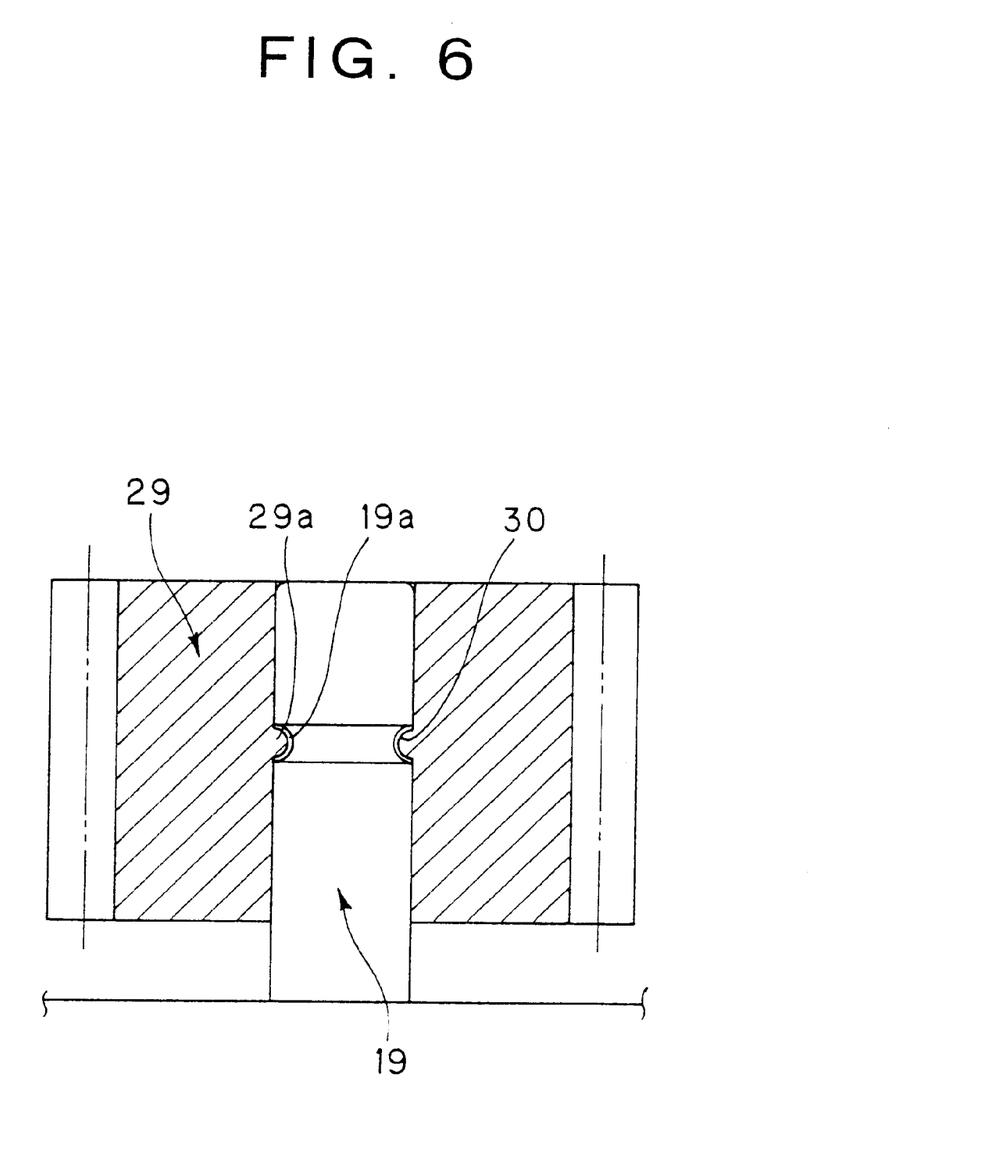
FIG. 6 is a cross sectional view illustrating other modifications of the driving gear and the stopping device of the pickup driving apparatus of the present invention.

FIG. 6 illustrates the other driving gear 29 and the other stopping device 30, which are modified. As shown in FIG.6, the stopping device 30 may be composed of a ring-shaped groove 19a that is formed on the periphery of the output shaft 19 into a semi-circular cross-section and of a ring-shaped projection 29a that is formed on the inner peripheral surface of the driving gear 29 so as to have the corresponding shape to the above-mentioned ring-shaped groove 19a. The ring-shaped projection 29a of the driving gear 29 and the ring-shaped groove 19a of the output shaft 19, which are engaged with each other, serve as the stopping device 30 so as to restrict the movement of the driving gear 29 in the axial direction of the output shaft 19. The driving gear 29 and the output shaft 19 are adjusted so that the former slips relative to the latter, when the prescribed torque is applied to the driving gear 29 in the same manner as in the above-mentioned driving gear 9. According such a modification, the part of the stopping device 30 can be formed integrally with the driving gear 29, thus reducing the number of structural parts of the apparatus.

In the above-mentioned embodiment of the present invention, the present invention is applied to the pickup driving apparatus in which the pickup is driven in the radius direction of the disc. However, the present invention is not limited only to the pickup driving apparatus and may be applied to any kind of apparatus in which a gear train has a rack and a movable body can be moved linearly by means of the gear train.

According to the present invention as described in detail, the driving gear can slip relative to the output shaft of the driving power source, when a prescribed load is applied to the driving gear. It is therefore possible to prevent an excessively large load from being applied to the driving gear. In case where a gear train including the driving gear is used, it is also possible to prevent the excessively large load from being applied to the gear train without forming deformed teeth on the opposite ends of the rack for making a linear motion of the movable body. Gears of the gear train always engage with each other, thus requiring no reciprocal motion of the driving power source in a small stroke to recover the normal state from the tooth jumping state. The driving operation of the movable body driving apparatus can be simplified, permitting to make a rapid operation.

What is claimed is:

1. An apparatus for driving a movable body, comprising:
   a driving power source having an output shaft; and
   a driving gear provided on said output shaft to drive said movable body,
   wherein:
      said driving gear is capable of slipping relative to said output shaft of said driving power source, and
      said apparatus further comprises a stopping device for restricting movement of said driving gear in an axial direction of said output shaft, said stopping device being provided on an outer peripheral surface of said output shaft.

2. The apparatus as claimed in claim 1, wherein:
   said driving power source comprises a driving motor; and
   said movable body comprises a pickup for an information recording and reproducing apparatus, said pickup being movable in a radius direction of a disc.

3. The apparatus as claimed in claim 1, wherein:
   said stopping device has a tubular shape into which said output shaft is fitted, said stopping device having an expanded portion; and
   said driving gear has an engaging portion engaging with said expanded portion of said stopping device.

4. The apparatus as claimed in claim 1, wherein:
   said stopping device comprises a pair of stoppers, each of said pair of stoppers having a tubular shape into which said output shaft is fitted, and
   said driving gear has recesses formed on opposite surfaces thereof, said recesses receiving said pair of stoppers, respectively.

5. The apparatus as claimed in claim 1, wherein:
   said stopping device comprises a ring-shaped groove, which is formed on a periphery of said output shaft into a semi-circular cross section, and a ring-shaped projection, which is formed on an inner peripheral surface of said driving gear, said ring-shaped projection engaging with said ring-shaped groove.

6. The apparatus as claimed in claim 1, wherein:
   said output shaft of said driving power source is connected to said movable body through a gear train for transmitting driving power from said driving power source to said movable body, said gear train including said driving gear; and
   said driving gear slips when a prescribed load is applied to said gear train.

7. The apparatus as claimed in claim 6, wherein:
   torque causing said driving gear to slip relative to said output shaft is larger than torque applied by said driving power source and smaller than breaking torque by which gear teeth of said gear train are broken.

8. The apparatus as claimed in claim 7, wherein:
   said driving power source comprises a driving motor; and
   said movable body comprises a pickup for an information recording and reproducing apparatus, said pickup being movable in a radius direction of a disc.

9. The apparatus as claimed in claim 1, wherein:
   torque causing said driving gear to slip relative to said output shaft is larger than torque applied by said driving power source and smaller than breaking torque by which gear teeth of said gear train are broken.

10. The apparatus as claimed in claim 9, wherein:
    said driving power source comprises a driving motor; and
    said movable body comprises a pickup for an information recording and reproducing apparatus, said pickup being movable in a radius direction of a disc.

11. The apparatus as claimed in claim 6, wherein:
    said driving power source comprises a driving motor; and
    said movable body comprises a pickup for an information recording and reproducing apparatus, said pickup being movable in a radius direction of a disc.

12. An apparatus for driving a movable body, comprising:
    a driving power source having an output shaft;
    a driving gear mounted on said output shaft to drive said movable body; and
    means for restricting movement of said driving gear in an axial direction of said output shaft,
    said driving gear being shippable relative to said output shaft.

* * * * *